(12) United States Patent
Barlerin et al.

(10) Patent No.: US 8,092,092 B2
(45) Date of Patent: Jan. 10, 2012

(54) GUIDE MEMBER

(75) Inventors: Jean-Claude Barlerin, Saint-Just-Rambert (FR); Eric Chaduiron, Viricelles (FR)

(73) Assignee: H.E.F., Andrezieus Boutheon (FR)

( * ) Notice: Subject to any disclaimer, the term of this patent is extended or adjusted under 35 U.S.C. 154(b) by 587 days.

(21) Appl. No.: 11/816,641

(22) PCT Filed: Feb. 20, 2006

(86) PCT No.: PCT/FR2006/050148
§ 371 (c)(1),
(2), (4) Date: May 27, 2008

(87) PCT Pub. No.: WO2006/087500
PCT Pub. Date: Aug. 24, 2006

(65) Prior Publication Data
US 2009/0123097 A1 May 14, 2009

(30) Foreign Application Priority Data

Feb. 21, 2005 (FR) ..................... 05 50473

(51) Int. Cl.
*F16C 33/02* (2006.01)
*F16C 33/00* (2006.01)
(52) U.S. Cl. .......................... 384/276; 384/292; 384/625
(58) Field of Classification Search ................. 384/206, 384/208, 213, 276, 280, 282–286, 288–294, 384/625; 29/898.04, 898.054–898.059
See application file for complete search history.

(56) References Cited

U.S. PATENT DOCUMENTS

| 1,153,647 | A | * | 9/1915 | Smalley ........................ 384/283 |
| 1,299,799 | A | * | 4/1919 | Smalley ........................ 384/283 |
| 1,892,179 | A | * | 12/1932 | Stockfleth ................ 29/898.058 |
| 2,241,789 | A | * | 5/1941 | Queneau et al. .............. 384/625 |
| 2,558,598 | A | | 6/1951 | Wightman |
| 3,047,934 | A | * | 8/1962 | Magner, Jr. .............. 29/898.058 |
| 4,678,348 | A | | 7/1987 | Tielemans et al. |
| 5,019,738 | A | | 5/1991 | Weilbach et al. |
| 5,387,461 | A | * | 2/1995 | Kamiya et al. ................. 428/216 |
| 5,468,567 | A | * | 11/1995 | Fujisawa et al. .............. 428/645 |
| 5,516,213 | A | * | 5/1996 | Moriyama et al. ............ 384/292 |
| 6,802,648 | B2 | * | 10/2004 | Merot et al. ................... 384/215 |
| 2002/0141669 | A1 | | 10/2002 | Testroet |

FOREIGN PATENT DOCUMENTS

| EP | 1288512 | 3/2003 |
| GB | 653708 | 5/1951 |

OTHER PUBLICATIONS

International Search Report; PCT/FR2006/050148; Jun. 12, 2006.

\* cited by examiner

*Primary Examiner* — James Pilkington
(74) *Attorney, Agent, or Firm* — Heslin Rothenberg Farley & Mesiti P.C.

(57) ABSTRACT

A guide member has a ring for mounting a pin with friction and articulation and/or sliding capacity. The member is adapted for mounting in the bore of a support. The ring and/or the pin is subjected, at least at its friction surface, to a surface hardening treatment by diffusion or by structural transformation, followed by finishing surface treatment for reducing the tendency to jamming and to reduce the friction coefficient. The friction surface of the ring, comprising its bore, has arrangements acting as a lubricant reserve. The outer periphery of the ring is joined to an element made from a deformable flexible material suitable for being engaged in the bore of the support.

12 Claims, 2 Drawing Sheets

GUIDE MEMBER

CROSS REFERENCE TO RELATED APPLICATIONS

This application is a Section 371 filing of International Application No. PCT/FR06/50148 filed on Feb. 20, 2006 and published in French as International Publication WO 2006/087500 published on Aug. 24, 2006, and claims priority of French Application 0550473 filed on Feb. 21, 2005, the entire contents of these applications being hereby incorporated by reference herein.

BACKGROUND OF THE INVENTION

The invention relates to the technical field of guide members.

One advantageous application concerns joints suitable for operating with high misalignments, impacts, and subject to vibratory actions with low amplitude movements. This type of joint may, for example, be found on rolling stock: trains, lorries, etc.

These joints generally consist of a guide member in the form of a body having a bore (ring for example) for mounting a pin with pivoting and/or sliding capacity. The body and/or pin may be treated or arranged to avoid wear, jamming and/or corrosion.

The body, for example in the form of a ring, is mounted rigidly in the bore of a member. Due to the movements of the pin and the rigid assembly of the ring, it is not possible to accept high misalignments, impacts, or vibratory actions.

It is the object of the invention to remedy these drawbacks in a simple, safe, effective and efficient manner.

The problem that the invention proposes to solve is to confer on the ring or other a certain degree of freedom with regard to its fixing mode, to accept high misalignments.

BRIEF SUMMARY OF THE INVENTION

To solve such a problem, and to solve the problem posed of preventing the jamming and/or corrosion, the guide member in the form of a ring for mounting a pin with friction and articulation and/or sliding capacity, the member being suitable for mounting in the bore of a support, is characterized in that:
the ring and/or the pin is subjected, at least at its friction surface, to a surface hardening treatment by diffusion or by structural transformation, followed by finishing surface treatment for reducing the tendency to jamming and to reduce the friction coefficient;
the friction surface of the ring, consisting of its bore, has arrangements suitable for acting as a lubricant reserve;
the outer periphery of the ring is joined to an element made from a deformable flexible material suitable for being engaged in the bore of a support.

Advantageously, the element of deformable flexible material is inserted into an outer ring of rigid material.

Various embodiments may be considered for the arrangements suitable for acting as a lubricant reserve. These arrangements may consist, for example, of holes, cavities, grooves forming a grid or chevrons.

Advantageously, these arrangements, suitable for acting as lubricant reserves, are placed at least between channels formed at each of the ends of the bore of the ring.

In this case, when the arrangements consist of grooves, the latter communicate with at least one of the channels.

According to another feature, the element of deformable flexible material is selected from elastomers. The element of deformable flexible material is joined to the ring by a bonding method.

Also for the purpose of solving the problem of jamming and/or corrosion, the pin, at least at its friction surface with the ring, is subjected to surface hardening treatment by diffusion or by structural transformation followed by finishing treatment and a treatment suitable for reducing the tendency to jamming and for reducing the efficient coefficient and/or the sensitivity to corrosion.

BRIEF DESCRIPTION OF THE DRAWING FIGURES

The invention is described in greater detail below in conjunction with the figures appended hereto in which.

DETAILED DESCRIPTION

Figure 1:
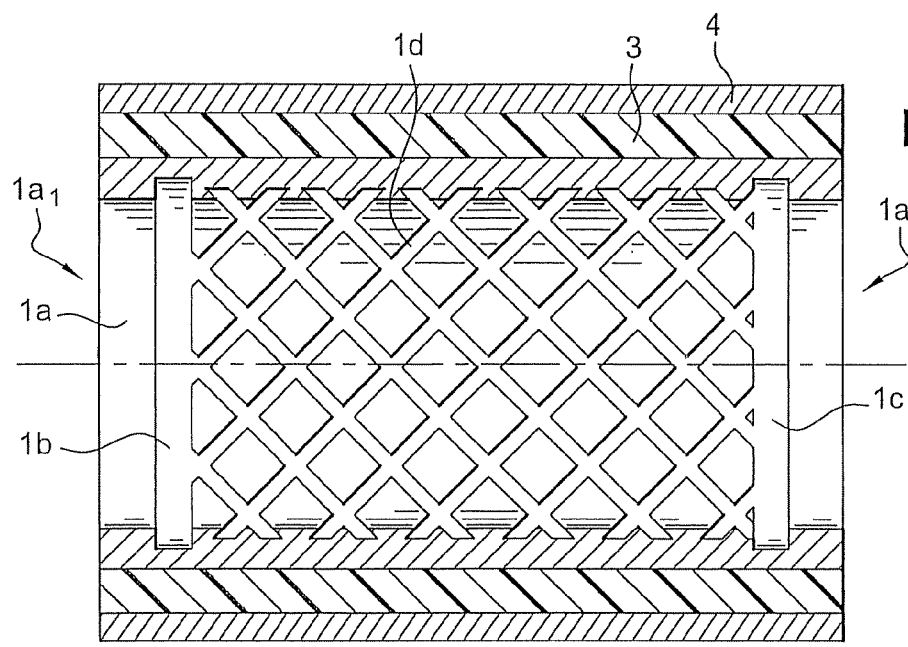
FIG. 1 is a longitudinal cross section of one embodiment of the guide member.
Figure 2:
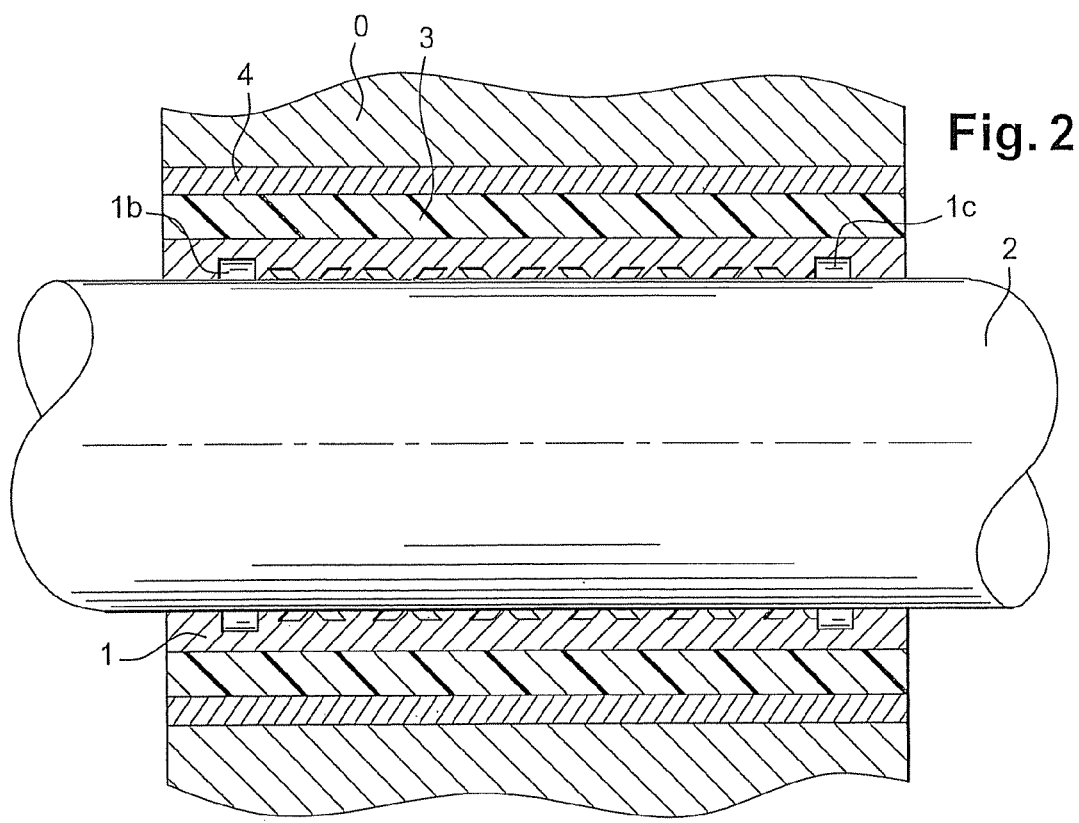
FIG. 2 is a longitudinal cross section, similar to FIG. 1, showing an exemplary assembly of the elastic guide member.

The guide member of the invention comprises a ring (1) and a pin (2) in combination with an elastically deformable element (3). For example, the device is suitable for mounting in the bore of a support (0).

The ring (1) is subjected, at least at its friction surface with the pin, to a surface hardening treatment by diffusion or by structural transformation, followed by finishing treatment and a treatment suitable for reducing the tendency to jamming and for reducing the friction coefficient. For example, the diffusion surface hardening treatment is selected from nitriding, nitrocarburizing, carbonitriding, case hardening, chromatizing. The surface hardening treatment by structural transformation may be a high frequency surface hardening. The finishing treatment is, for example, a surface oxidation or phosphatation reaction, followed either by soluble or whole oil impregnation, or the application to the surface of a coating for reducing the tendency to jamming and for reducing the friction coefficient and/or sensitivity to corrosion.

The coating or treatment suitable for reducing the tendency to jamming and for reducing the friction coefficient and/or the sensitivity to corrosion, may consist of a layer of polymer optionally containing a solid lubricant, particularly graphite, molybdenum bisulphide or PTFE.

According to the invention, in combination with these various treatments, the bore (1a) of the ring (1) has arrangements suitable for acting as a lubricant reserve such as grease. Such arrangements made on the shaft which constitutes the opposing part of the ring also form part of the invention.

Various technical solutions may be considered. For example, these arrangements consist of holes or cavities formed in the thickness of the ring at the level of the bore (1a). As an alternative, these arrangements consist of groves (1d) suitably oriented to form a grid (figures of the drawings) or chevrons, joined or not at their apex.

Advantageously, these arrangements, regardless of their embodiment, are placed at least between channels (1b) and (1c) formed at each of the ends (1a1) and (1a2) of the bore (1a) of the ring (1).

In the case of grooves (1d), the said grooves communicate with at least one of the channels (1b) or (1c).

The channels (1b) and (1c) are conformed to prevent the grease or other lubricant from leaving the friction surface.

For information and in a non-limiting manner, the depth of the channels (1b) and (1c) may be between 0.3 and about 3 mm. More generally, the depth of the channels (1b) and (1c) is, at most, equal to substantially one-third of the thickness of the body (1).

Figure 3:
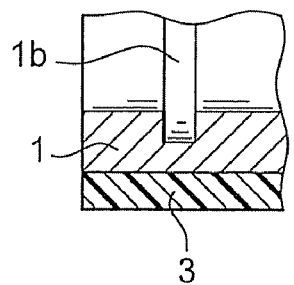
FIGS. 3, 4, 5 and 6 show various embodiments in the channels.
Figure 4:
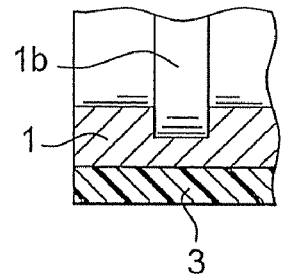
Figure 5:
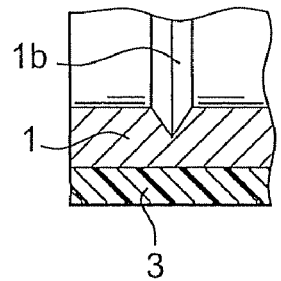
Figure 6:
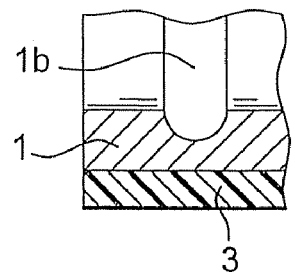

The profile of the channels may have various shapes, particularly square (FIG. 3), rectangular (FIG. 4), triangular (FIG. 5), round (FIG. 6), being bevelled or not.

In view of the problem to be solved, to prevent the grease from leaving the friction surface, the channels (1b) and (1c) are positioned at a distance from each of the ends (1a1) and (1a2) of the bore, between 1 and about 6 mm. Similarly, the width of the channels (1b) and (1c) is between 0.5 and about 5 mm.

In view of the combination of channels (1b) and (1c) and grooves (1d), it results that the said channels in communication with the said grooves serve to prevent the removal of the lubricant present in the zone bounded by the said grooves (1d), the channels also acting as a grease reserve to resupply these grooves.

The depth of the channels (1b) and (1c) is about 1 to 10 times higher than the depth of the grooves (1d). The grooves (1d) bound a zone (chevrons or grid, for example) representing about 30 to 70% of the friction zone.

According to another important feature of the invention, the outer periphery of the ring (1) is joined to the deformable flexible element (3) suitable for being engaged in the bore of the member (O). This element (3) is selected from elastomers. The element (3) is joined to the periphery of the ring (1) by a bonding method.

According to the applications considered, the combination of the ring (1) and the elastomer element (3) can be joined to an outer ring (4). As previously, the outer ring (4) is fixed to the elastomer element (3) by a bonding method. It should be noted that the surfaces of the two rings (1) and (4) to which the elastomer element (3) is fixed, may previously undergo a preparation, particularly by micro-shot blasting or micro-sand blasting.

Also for the purpose of solving the problem posed of avoiding jamming or corrosion, the pin (2) may also be subjected to surface hardening treatment by diffusion or by structural transformation followed by a finishing treatment and a treatment suitable for reducing the tendency to jamming and for reducing the friction coefficient. This treatment of the pin (2) may, optionally, be combined with arrangements suitable for acting as lubricant reserves, of the type of those described for the ring (1).

The advantages clearly appear from the description.

The invention claimed is:

1. A guide member comprising a ring for mounting a pin with friction, articulation and/or sliding capacity, the guide member being adapted for mounting in a bore of a support, wherein:
   the ring and/or the pin is subjected, at least at a friction surface of the ring and/or the pin, to a surface hardening treatment by diffusion or structural transformation, followed by finishing surface treatment of surface oxidation or phosphatation reaction, followed by a treatment for reducing tendency to jamming and for reducing friction coefficient;
   the friction surface of the ring comprises a bore of the ring and has grooves acting as a grease reserve, the grooves are located at least between channels formed at each end of the bore of the ring and communicate with said channels, depth of the channels being about 1 to 10 times higher than depth of the grooves; and
   an outer periphery of the ring is joined to an element made from a deformable flexible material engaged in the bore of the support.

2. The guide member according to claim 1, wherein the element of deformable flexible material is inserted into located within an outer ring.

3. The guide member according to claim 1, wherein the grooves form a grid.

4. The guide member according to claim 1, wherein the grooves form chevrons.

5. The guide member according to claim 1, wherein the element of deformable flexible material comprises an elastomer.

6. The guide member according to claim 1, wherein the element of deformable flexible material is bonded to an outer periphery of the ring.

7. The guide member according to claim 1, wherein the treatment for reducing tendency for jamming and for reducing friction coefficient comprises applying a layer of polymer, or soluble or whole oil impregnation.

8. The guide member of claim 7, wherein the polymer contains a solid lubricant.

9. The guide member of claim 8, wherein the solid lubricant comprises at least one of graphite, molybdenum bisulphide, and PTFE.

10. A method for providing a guide member comprising a ring for mounting a pin with friction, articulation and/or sliding capacity and ability to withstand misalignment, impact and vibratory action, in a bore of a support, comprising:
    subjecting a friction surface of a bore of the ring to a surface hardening treatment by diffusion or structural transformation, followed by a finishing surface treatment of surface oxidation or phosphatation reaction, followed by a treatment for reducing tendency to jamming and for reducing friction coefficient;
    providing the friction surface of the bore of the ring with grooves acting as a grease reserve, the grooves being located at least between channels formed at each end of the bore of the ring and communicating with the channels, depth of the channels being about 1 to 10 times higher than depth of the grooves;
    bonding an element made from a deformable flexible material to an outer periphery of the ring;
    bonding an outer periphery of the element made from a deformable flexible material to an inside surface of an outer ring; and
    mounting the outer ring within the bore of the support.

11. The method of claim 10, wherein the treatment for reducing tendency for jamming and for reducing friction coefficient comprises applying a layer of polymer containing a solid lubricant, the solid lubricant comprising at least one of graphite, molybdenum bisulphide and PTFE.

12. The method of claim 10, further comprising a pre-bonding treatment of the outer periphery of the ring and the inside surface of the outer ring by micro-shot blasting or micro-sand blasting.

* * * * *

UNITED STATES PATENT AND TRADEMARK OFFICE
CERTIFICATE OF CORRECTION

PATENT NO. : 8,092,092 B2  Page 1 of 1
APPLICATION NO. : 11/816641
DATED : January 10, 2012
INVENTOR(S) : Barlerin et al.

It is certified that error appears in the above-identified patent and that said Letters Patent is hereby corrected as shown below:

Column 4, Line 11, Claim 2,: after "flexible material is" Delete "inserted into"

Signed and Sealed this
Twenty-seventh Day of March, 2012

David J. Kappos
*Director of the United States Patent and Trademark Office*